July 4, 1939. R. L. BUNTING 2,164,566
AIR CONDITIONING APPARATUS FOR MOTOR VEHICLES
Filed June 10, 1937
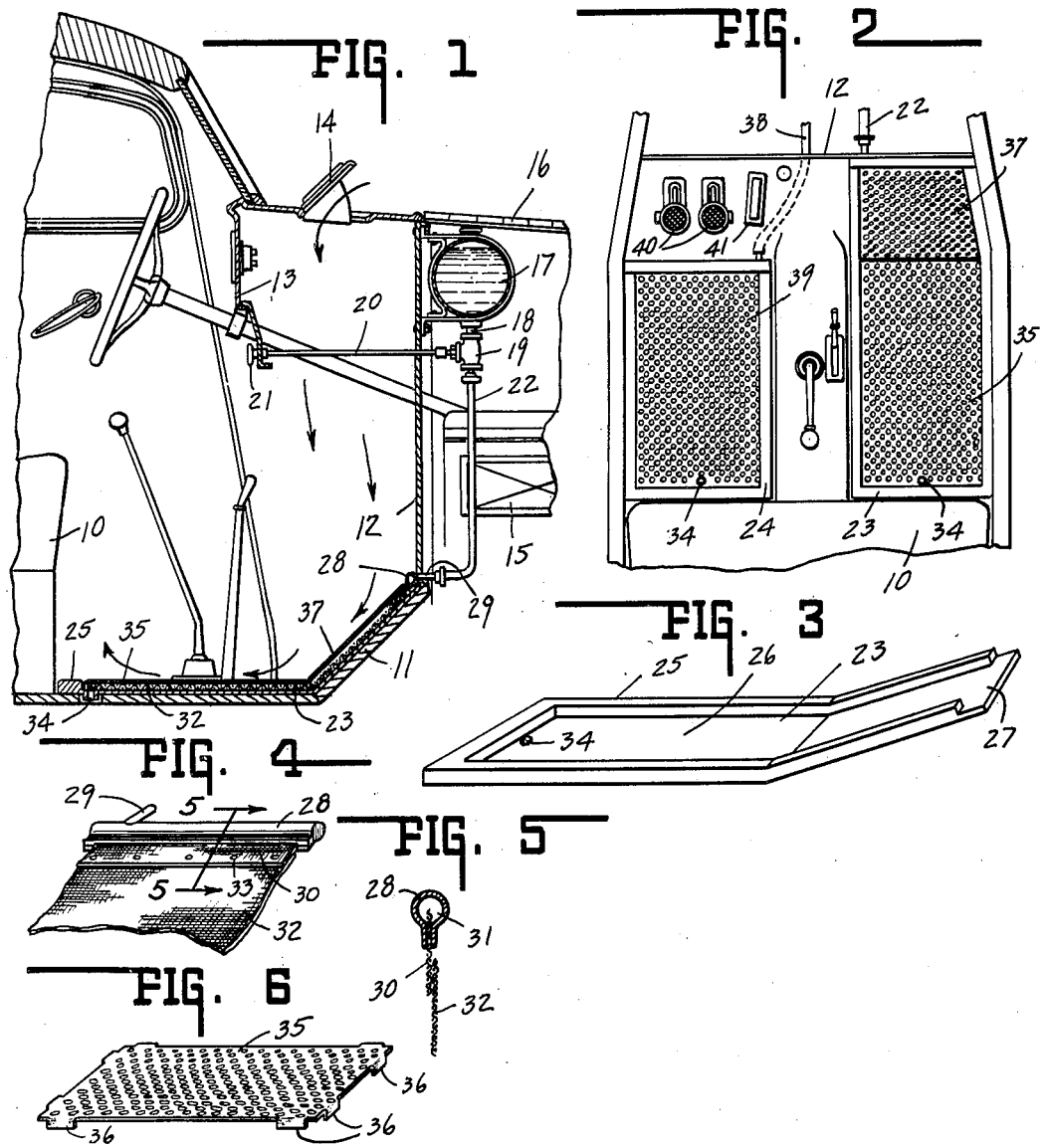
INVENTOR.
ROBERT LEE BUNTING.
BY Lockwood Galdsmith & Galt
ATTORNEYS.

Patented July 4, 1939

2,164,566

UNITED STATES PATENT OFFICE 2,164,566

AIR CONDITIONING APPARATUS FOR MOTOR VEHICLES

Robert Lee Bunting, Danville, Ill.

Application June 10, 1937, Serial No. 147,421

5 Claims. (Cl. 261—103)

This invention relates to air conditioning apparatus for motor vehicles.

The principal object of the invention is to clean, cool and humidify the incoming air in motor car bodies and thus to add to the comfort, health and safety of the occupants.

Another object of the invention in one of its preferred forms is to prevent the accumulation of dry dust and dirt upon the floor of such vehicles. A certain amount of such dust and dirt is invariably present in the average motor car and has been known to cause serious accidents when blown into the face and eyes of the driver by a sudden opening of the cowl ventilator or a window when the car is travelling at high speed.

Another object of the invention is to insulate the interior of a motor vehicle, and particularly the front seat space, from the heat of the engine and from heat rising from the pavement.

Another object of the invention is generally to improve the details of air cooling and humidifying apparatus and to adapt the same to motor vehicles.

In one of its preferred forms, the invention includes a base mat for the floor of the front seat space of an automobile, said mat having a receptacle in which there is placed an absorbent material kept saturated with water from a suitable supply tank. A weight-supporting grill work preferably covers the absorbent material to prevent wetting of the shoes and clothing of the occupants.

The apparatus just described, located on the floor of the front seat space, is in the path of the air current entering by the cowl ventilator. Evaporation caused by the passage of this air current over the saturated absorbent serves to cool and moisten the air immediately upon entrance into the interior of the car.

One feature of the invention resides in the provision of positive means for supplying the necessary moisture for saturating the absorbent.

Other objects and features of the invention will be understood from the accompanying drawing and the following description and claims:

Fig. 1 is a longitudinal sectional view of a portion of a motor vehicle having a preferred form of the invention applied thereto. Fig. 2 is a plan view of the flooring of the front seat space of the vehicle showing the same form of the invention. Fig. 3 is a perspective view of one of the principal parts of the invention when embodied in the form shown in Figs. 1 and 2. Fig. 4 is a perspective view of another part of the invention. Fig. 5 is a sectional view taken on the line 5—5 of Fig. 4. Fig. 6 is a perspective view of a form of floor grill used with the structure illustrated in the preceding figures.

Referring particularly to the form of the invention shown by way of illustration in Figs. 1 to 6, inclusive, there is illustrated in the drawing a portion of a motor vehicle having the usual front seat 10, flooring 11, dash 12, instrument board 13, cowl ventilator 14, engine 15 and hood 16. Beneath the hood 16 there is provided a water tank 17 having an outlet pipe 18 communicating with the valve 19. The valve 19 is provided with an extension rod 20 and control knob 21, the latter being mounted upon the instrument board 13 and being adapted to control the flow of water through the valve 19. From the valve 19, a conduit 22, preferably a flexible rubber hose, leads downwardly to supply water to the cooling and humidifying apparatus hereinafter described.

Resting on the flooring 11 there are provided a pair of base mats 23 and 24, the mat 23 being shown in detail in Fig. 3. Said mats may be constructed of any suitable material, but preferably a form of rubber is used. The mat 23 is provided about three sides with an upraised rim 25 defining a central receptacle or tray 26. The extreme upper edge of the mat 23 is provided with a lip 27 adapted to receive a manifold 28 connected by a pipe 29 to the conduit 22. The manifold 28 is formed as best seen in Figs. 4 and 5 and the lower edge thereof is shaped to clamp about a strip 30 of absorbent material, the upper edges of the strip extending upwardly into a longitudinal opening 31 within the manifold 28. A sheet 32 of absorbent material is detachably secured to the strip 30 by snap fasteners 33 or other suitable means and is shaped to substantially cover the surface of the tray 26. The strip 30 and sheet 32 are preferably of some fabric adapted to absorb and retain a relatively large supply of water. Turkish toweling has been found satisfactory. Other substances, not fabrics, such as felt or sponge, may also be used. A drain 34 passing through the flooring 11 is provided for each of the mats 23 and 24. A grill 35, best shown in Fig. 6 and preferably of perforated sheet metal construction, is provided with legs 36 adapted to fit within the tray 26 and serves to cover the horizontal portion of the sheet 32 and to prevent wetting of the feet and garments of the occupants. The legs 36 are sufficiently long to support the grill 35 above the level of the sheet 32 and thus to permit complete circulation of air beneath the grill. The holes in the grill preferably have a greater total area than the metallic surface thereof so the greater part of the area of sheet 32 is completely exposed. A similar grill 37 covers the upwardly sloping part of the tray 26.

The mat 24 is provided with a similar sheet of absorbent material connected to the water supply tank by a conduit 38 and with a similar grill 39. The mat 24 extends only part way up the inclined part of the flooring 11 in order to avoid the brake and clutch pedals 40 and accelerator 41.

In the use of this form of the invention, the valve 19 is set to provide a flow of water sufficient to make up for evaporation and to keep the absorbent sheets in a saturated condition. These sheets are directly in the path of the air flow from the cowl ventilator 14 as shown by arrows in Fig. 1. In hot weather, this rapidly moving stream of air causes a large evaporation of water from the sheet 32 and is thus cooled and moistened to provide much greater comfort. At the same time, due to the grill openings and the space between the wet sheet and grill, it is impossible for dry dust and dirt to accumulate on the floor of the car. There is, therefore, no danger or discomfort from flying particles of dirt when the cowl ventilator is opened, no matter what the speed of the car. When it is desired to clean the device, it is only necessary to remove the grills 35, 37 and 39 and then to detach the sheets 32 from their associated strips 30, wash the same and replace. The removal and replacement need take only a few minutes. In cold weather the pipe 29 may be disconnected from the conduit 22 and the whole structure removed from the floor. It is obvious that the device may be installed as an accessory on a car already in use as well as during the manufacture of the car.

The foregoing specification describes a preferred form of the invention but variations may obviously be made therein without departing from the scope thereof as defined by the appended claims.

The invention claimed is:

1. In a motor vehicle having a cowl ventilator, an open water absorbent and diffusing means arranged on the floor of said vehicle in position to receive a stream of air from said ventilator, and a reticulated weight-bearing cover therefor.

2. In a motor vehicle having a cowl ventilator, an open water absorbent and diffusing means arranged on the floor of said vehicle in position to receive a stream of air from said ventilator, and means protecting the occupants of the car against contact therewith but leaving the greater part of said first mentioned means open to the atmosphere.

3. In a motor vehicle, the combination of a tray-like structure placed on the floor of said vehicle, a sheet of absorbent material resting in said tray, a water supply reservoir, and a manifold adapted to receive water therefrom and to supply the same to one edge of said sheet.

4. In a motor vehicle, the combination of a tray-like structure placed on the floor of said vehicle, a sheet of absorbent material resting in said tray, a water supply reservoir, a manifold adapted to receive water therefrom, a strip of absorbent material having one edge projecting within the manifold, and means detachably securing together said sheet and strip.

5. In a motor vehicle, an open water absorbent and diffusing means arranged on the floor of said vehicle, and a reticulated weight-bearing cover therefor, said cover being spaced above said means to permit circulation of air therebetween.

ROBERT LEE BUNTING.